(12) United States Patent
Amit et al.

(10) Patent No.: US 8,595,199 B2
(45) Date of Patent: Nov. 26, 2013

(54) REAL-TIME SELECTION OF COMPRESSION OPERATIONS

(75) Inventors: Jonathan Amit, Omer (IL); Lilia Demidov, Ness-Tziona (IL); Nir Halowani, Holon (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/345,602

(22) Filed: Jan. 6, 2012

(65) Prior Publication Data

US 2013/0179410 A1 Jul. 11, 2013

(51) Int. Cl.
*G06F 7/00* (2006.01)
*G06F 17/00* (2006.01)

(52) U.S. Cl.
USPC .......................................... 707/693; 707/694

(58) Field of Classification Search
None
See application file for complete search history.

(56) References Cited

U.S. PATENT DOCUMENTS

| | | | | |
|---|---|---|---|---|
| 5,675,789 A * | 10/1997 | Ishii et al. | ............................. | 1/1 |
| 2001/0031092 A1 | 10/2001 | Zeck et al. | | |
| 2002/0101367 A1 | 8/2002 | Geiger et al. | | |
| 2003/0034905 A1 | 2/2003 | Anton et al. | | |
| 2007/0109156 A1 * | 5/2007 | Fallon | ............. | 341/50 |
| 2007/0174209 A1 * | 7/2007 | Fallon et al. | ................... | 705/80 |
| 2009/0245629 A1 * | 10/2009 | Hayami et al. | ............... | 382/166 |
| 2009/0245630 A1 * | 10/2009 | Johnston | ....................... | 382/166 |
| 2010/0281079 A1 * | 11/2010 | Marwah et al. | ............... | 707/812 |
| 2010/0316114 A1 | 12/2010 | Fallon et al. | | |

FOREIGN PATENT DOCUMENTS

| | | |
|---|---|---|
| EP | 0866426 A1 | 9/1998 |
| GB | 2402766 A | 12/2004 |
| WO | 9637846 A1 | 11/1996 |
| WO | 9748212 A1 | 12/1997 |

OTHER PUBLICATIONS

Martin Burtscher et al., "High Throughput Compression of Double-Precision Floating-Point Data," School of Electrical and Computer Engineering, Cornell University, Ithaca, NY, 2007, 10 pages.

Frédéric Gilbert et al., "Intelligent Compression of Still Images," Proceedings of 6th ACM International Multimedia Conference, Bristol, Sep. 12-16, 1998, 2 pages.

Sonja Grgić et al., "Reliability of Objective Picture Quality Measures," Journal of Electrical Engineering, vol. 55, No. 1-2, 2004, pp. 3-10.

\* cited by examiner

*Primary Examiner* — Hung T Vy
*Assistant Examiner* — Tuan A Pham
(74) *Attorney, Agent, or Firm* — Griffiths & Seaton PLLC

(57) ABSTRACT

Exemplary method, system, and computer program product embodiments for real-time selection of compression operations are provided. In one embodiment, by way of example only, available compression operations are initialized according to an assigned success factor. The available compression operations are tested for determining if at least one of the compression operations yields a compression ratio greater than a minimal compression ratio. The available compression operations selected in real time for compressing at least one of the data blocks is applied. Additional system and computer program product embodiments are disclosed and provide related advantages.

4 Claims, 6 Drawing Sheets

$$S_i = \sum_{n=0}^{\infty} \ln(x_n)D_n \qquad D = \begin{cases} 0 - \text{Did not use algorithm=} \\ 1 - \text{Used Algorithm} \end{cases}$$

$$\ln(x) = \int_1^x \ln\left(\frac{1}{t}\right) dt$$

REAL-TIME SELECTION OF COMPRESSION OPERATIONS

BACKGROUND OF THE INVENTION

1. Field of the Invention

The present invention relates generally to computers, and more particularly, to real selection of compression operations in a computing environment.

2. Description of the Related Art

In today's society, computer systems are commonplace. Computer systems may be found in the workplace, at home, or at school. Computer systems may include data storage systems, or disk storage systems, to process and store data. In recent years, both software and hardware technologies have experienced amazing advancement. With the new technology, more and more functions are added and greater convenience is provided for use with these electronic appliances. One of the most noticeable changes introduced by recent computer technology is the inclusion of images, video, and audio to enhance the capabilities of computers and electronic appliances. In the age of multimedia, the amount of information to be processed increases greatly. One popular method of handling large data files is to compress the data for storage or transmission. Therefore, processing very large amounts of information is a key problem to solve.

SUMMARY OF THE DESCRIBED EMBODIMENTS

With increasing demand for faster, more powerful and more efficient ways to store information, optimization of storage technologies is becoming a key challenge. Logical data objects (data files, image files, data blocks, etc.) may be compressed for transmission and/or storage. A need exists to find the best compression operation (e.g., compression algorithm that yields a compression ratio that is greater than or higher than a minimal compression ratio that is defined) for each data set, particularly when the number of compression operations increase due to intensive central processor unit (CPU) usage.

Accordingly, and in view of the foregoing, various exemplary method, system, and computer program product embodiments for real-time selection of compression operations are provided. In one embodiment, by way of example only, available compression operations are initialized according to an assigned success factor. The available compression operations are tested for determining if at least one of the compression operations yields a compression ratio greater than a minimal compression ratio. The available compression operations selected in real time for compressing at least one of the data blocks is applied. Additional system and computer program product embodiments are disclosed and provide related advantages.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF CERTAIN EMBODIMENTS

Figure 1:
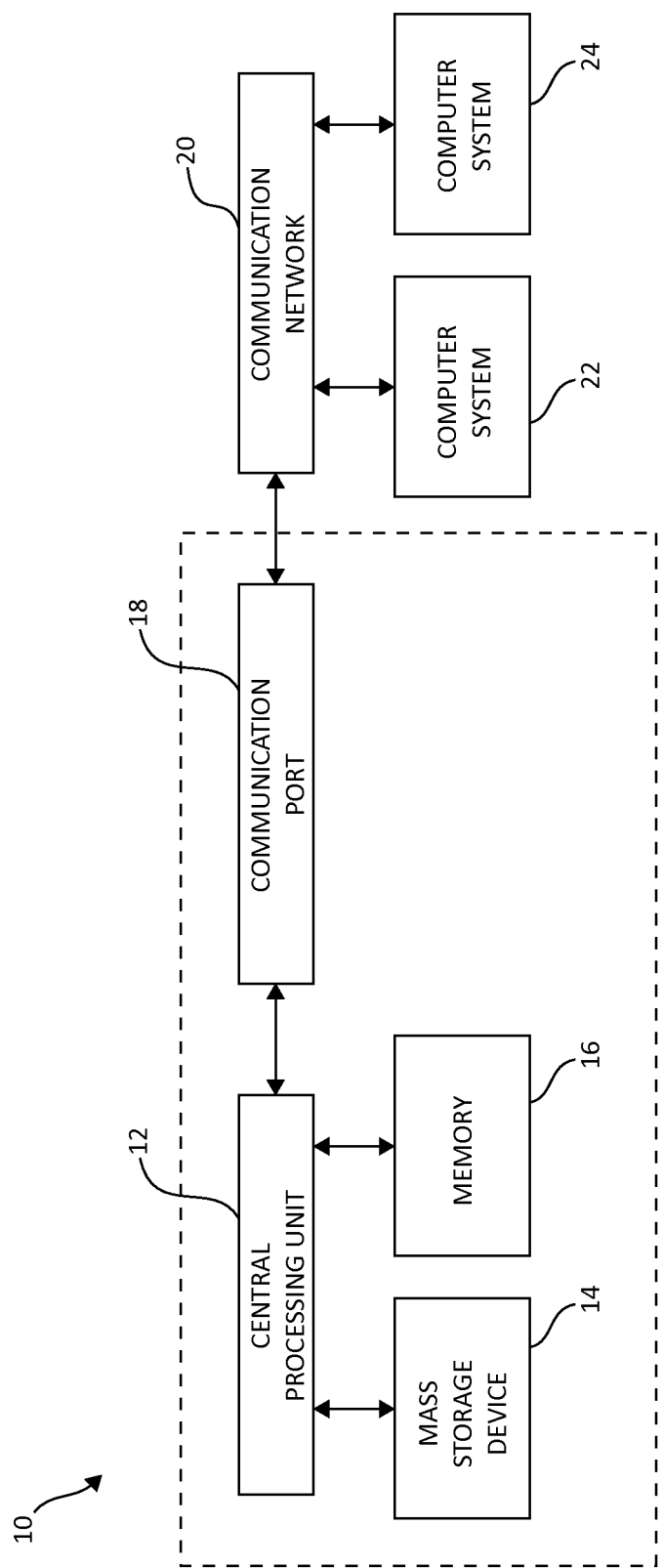
FIG. 1 illustrates a computer storage environment having an example storage device in which aspects of the present invention may be realized.

As mentioned previously, with increasing demand for faster, more powerful and more efficient ways to store information, optimization of storage technologies is becoming a key challenge. For a specific data set, in a storage array, a specialized compression algorithm may achieve a higher compression ratio than a general-purpose algorithm. A data compression ratio may be used to quantify the reduction in data-representation size produced by a data compression algorithm. The data compression ratio may be the ratio between the compressed size and the uncompressed size. The compression ratio depends on the data being stored. For example, using an image compression algorithm for an image data set will yield a high compression ratio. On the other hand, for video content in a data set, applying a completely different algorithm may increase the storage compression ratio. Thus, selecting the best algorithm for each data set is critical when having multiple content types (e.g., Joint Photographic Experts Group "JPEG," Moving Picture Experts Group "MPEG," MPEG-3 "MP3," Third Generation Partnership Project File Format "3GP," Tagged Image File Format "TIFF," Graphics Interchange Format "GIF," ZLIB, and Portable Network Graphics "PNG") being stored in the storage array. In many situations the data set content is unknown during the compression operations. For example, a block storage array may be unaware of the files and the file types stored in the block storage array without the content type being detected. Detection of the content type of the data type may also be hindered when the content is embedded in other files. For example, a word document may contain images and audio content. A database file may also contain video in blob storage, which also hinders achieving the required compression ratio due to the inability to detect the content of the data set.

In contrast, and to address the inefficiencies previously described, the mechanisms of the illustrated embodiments serve to create a solution for bridging the gap between applications and naive storage platforms by gaining an understanding of how a given file is structured and selecting from a portfolio of algorithms (e.g., compression operations) the one that is most effective for the targeted data set. By understanding the layout of specific application files/blocks, the mechanisms of the present invention make intelligent decisions for selecting the best compression algorithm yielding compression ratio greater than a minimal accepted compression ratio that is defined on a targeted data set for optimal storage. To accomplish these objectives, in one embodiment, at least one compression operation selected from a list for compressing data blocks is applied to the data set. The selected one of the at least one of the compression operations has the highest compression ratio. It should be noted that the mechanisms of the present invention seek to select a compression operation (e.g., compression algorithm), which achieves a compression ratio that is greater than or higher than a minimal compression ratio that is defined. The mechanisms of the present invention may not necessarily find, obtain, or locate the compression operation that yields the highest compression ratio. Thus, it may be unnecessary to check and test each and every available compression ratio.

Turning to FIG. 1, an example computer system 10 is depicted in which aspects of the present invention may be realized. Computer system 10 includes central processing unit (CPU) 12, which is connected to mass storage device(s) 14 and memory device 16. Mass storage devices may include hard disk drive (HDD) devices, which may be configured in a redundant array of independent disks (RAID). The backup operations further described may be executed on device(s) 14, located in system 10 or elsewhere. Memory device 16 may include such memory as electrically erasable programmable read only memory (EEPROM) or a host of related devices. Memory device 16 and mass storage device 14 are connected to CPU 12 via a signal-bearing medium. In addition, CPU 12 is connected through communication port 18 to a communication network 20, having an attached plurality of additional computer systems 22 and 24. The computer system 10 may include one or more processor devices (e.g., CPU 12) and additional memory devices 16 for each individual component of the computer system 10 to execute and perform each operation described herein to accomplish the purposes of the present invention.

Figure 2:
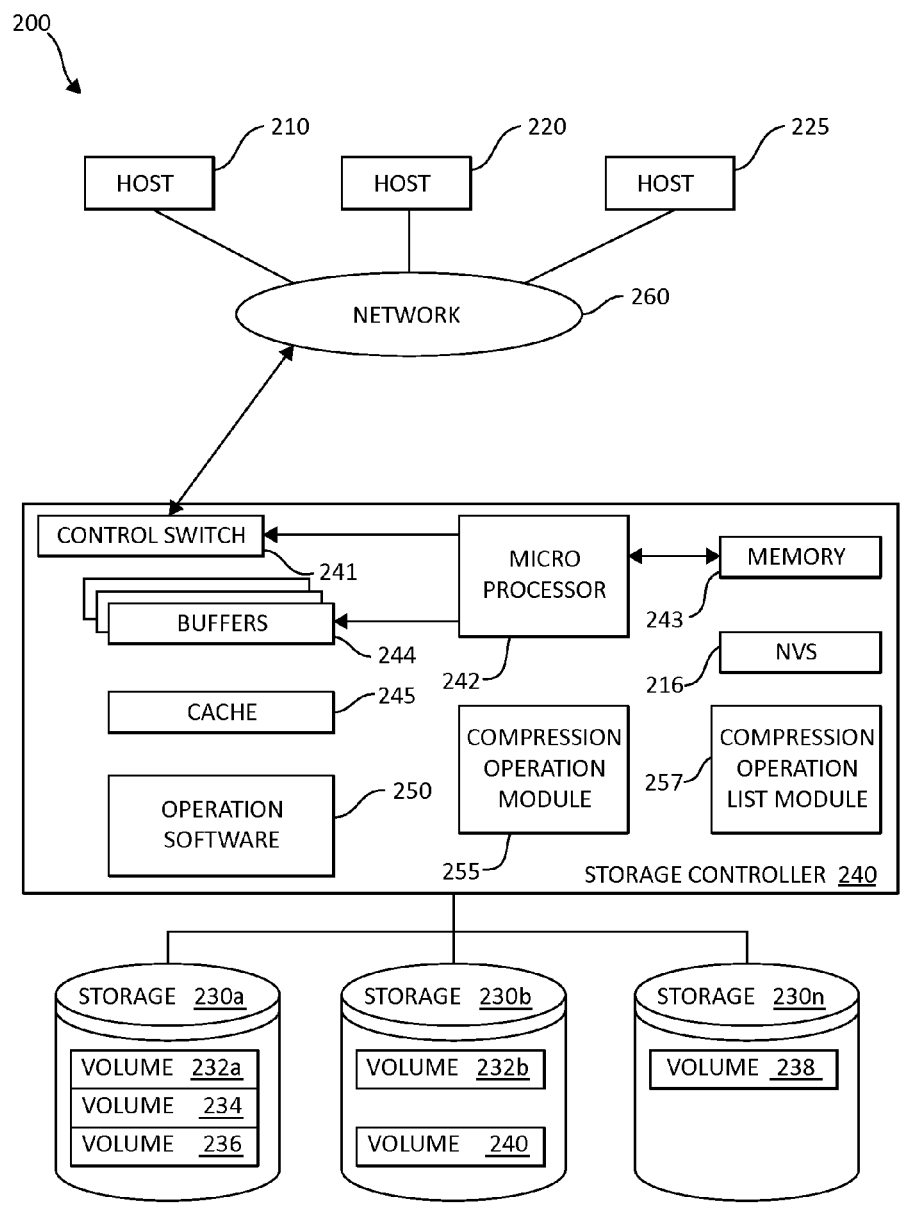
FIG. 2 illustrates an exemplary block diagram showing a hardware structure of a data storage system in a computer system in which aspects of the present invention may be realized.

FIG. 2 is an exemplary block diagram 200 showing a hardware structure of a data storage system in a computer system according to the present invention. Host computers 210, 220, 225, are shown, each acting as a central processing unit for performing data processing as part of a data storage system 200. The hosts (physical or virtual devices), 210, 220, and 225 may be one or more new physical devices or logical devices to accomplish the purposes of the present invention in the data storage system 200. In one embodiment, by way of example only, a data storage system 200 may be implemented as IBM® System Storage™ DS8000™. A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adapter 260 to communicate. Data storage system 200 is depicted in FIG. 2 comprising storage controller 240 and storage 230.

To facilitate a clearer understanding of the methods described herein, storage controller 240 is shown in FIG. 2 as a single processing unit, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200. Storage 230 may be comprised of one or more storage devices, such as storage arrays, which are connected to storage controller 240 by a storage network.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data which the processor 242 may access for executing functions and method steps associated with managing storage 230 and executing the steps and methods of the present invention for snapshot operation in a computer storage environment. In one embodiment, system memory 243 includes, is associated, or is in communication with the operation software 250 for performing the discard scans in a computer storage environment, including the methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations.

Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a compression operation module 255 and compression operation list module 257. The compression operation module 255 and compression operation list module 257 may work in conjunction with each and every component of the storage controller 240, the hosts 210, 220, 225, and storage devices 230. Both the compression operation module 255 and compression operation list module 257 may be structurally one complete module or may be associated and/or included with other individual modules. The compression operation module 255 and compression operation list module 257 may also be located in the cache 245 or other components.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control and each table described later, cache 245 for temporarily storing (buffering) data, and buffers 244 for assisting the cache 245 to read and write data, a control switch 241 for controlling a protocol to control data transfer to or from the storage devices 230, and compression operation module 255 and compression operation list module 257 in which information may be set. Multiple buffers 244 may be implemented with the present invention to assist with the operations as described herein.

In one embodiment, the host computers or one or more physical or virtual devices, 210, 220, 225 and the storage controller 240 are connected through a network adaptor (this could be a fibre channel) 260 as an interface i.e., via a switch called "fabric." In one embodiment, the operation of the system shown in FIG. 2 will be described. The microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, compression operation module 255 and compression operation list module 257 are in communication with each other and may be separate or one individual component(s). Also, several, if not all of the components, such as the operation software 250 may be included with the memory 243. Each of the components within the devices shown may be linked together and may be in communication with each other for purposes suited to the present invention.

Figure 3:
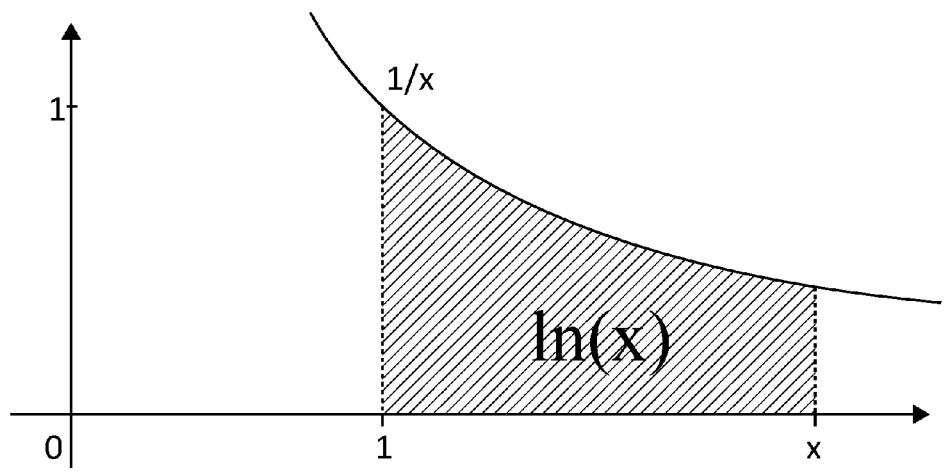
FIG. 3 illustrates an exemplary block diagram for calculating a success factor.

FIG. 3 illustrates an exemplary block diagram 300 for calculating a success factor. In one embodiment, the mechanisms seek to increase the compression ratio of storage array by choosing the best compression method (e.g., selects a compression operation that yields a compression ratio that is greater than or higher than a minimal compression ratio that is defined) for the content of each data set. By selecting the first compression operation that yields a compression ratio that is greater than a minimally accepted and defined compression ratio, efficiency and productivity is increased by not iterating and testing each of the available compression operations. The mechanisms test previously achieved compression ratios for each of the different compression algorithms. Unlike applying a specialized compression algorithm, where each of the algorithms that are applied use an intensive amount of CPU and may not be used for large number of algorithms, the mechanisms choose the compression operation that yields similar compression ratios as those obtained in use of a specialized compression algorithm by testing/trying the compression operations that yields highest compression ratio in real-time with no limitations to the number of compression algorithms used. Moreover, the limitless number of compression algorithms used, do not affect the CPU load. The mechanisms use collected statistical information, success and failure learning machines and threshold algorithm testing for selecting the compression algorithm to apply to data that is to be stored.

As illustrated in FIG. 3, the mechanisms are aware of the data set's content type for the compression. To assist with the increase of the compression ratio for data storage by choosing the best compression operation (e.g., selects a compression operation that yields a compression ratio that is greater than or higher than a minimal compression ratio that is defined) for each type of data content, the following formula is used:

$$Si = \sum_{n=0}^{\infty} \ln(X_n)D_n, \qquad (1)$$

where Si represents an algorithm for accumulating a success factor value, the D may be either 0, if the algorithm was not chosen as yielding the highest compression operation, or 1, if the algorithm was chosen as yielding the highest compression operation, the Si may include the sum ($\Sigma_{n=0}^{\infty}$) of all success values in the factor of the curve ln(x) with n being the number of compression operations being tested, and the ln(x) is defined as the area under the curve, such as the function $f(x)=1/x$ from 1 to x, represented by the formula:

$$\ln(x) = \int_1^x \ln\left(\frac{1}{t}\right)dt, \qquad (2)$$

where t represents time, the number 1 is the first data block decision factor (either 0 or 1), and x is the current block decision factor taking the integration of the logarithm of (1/t) from 1 to x. In other words, as the mechanisms continue to process data blocks, the formula indicates that an older data block decision effect on Si (for example, the blocks which were processes at the beginning) are becoming less and less important while the more relevant (e.g., newest) data blocks have more impact and effect on the value of Si. Thus, the mechanisms will become aware of the content by trying each of the various compression operations, which means over time, the listing order of the compression operations reflect the real environment data distribution and the possibility of each data occurrence within a block, and thus, the mechanisms are more likely to select only the first set of compression operations within the list. The order in which the compression operations are selected for use is in accordance with the Si values (e.g., the compression operations with the highest Si value are selected first for choosing the highest compression operation).

Figure 4:
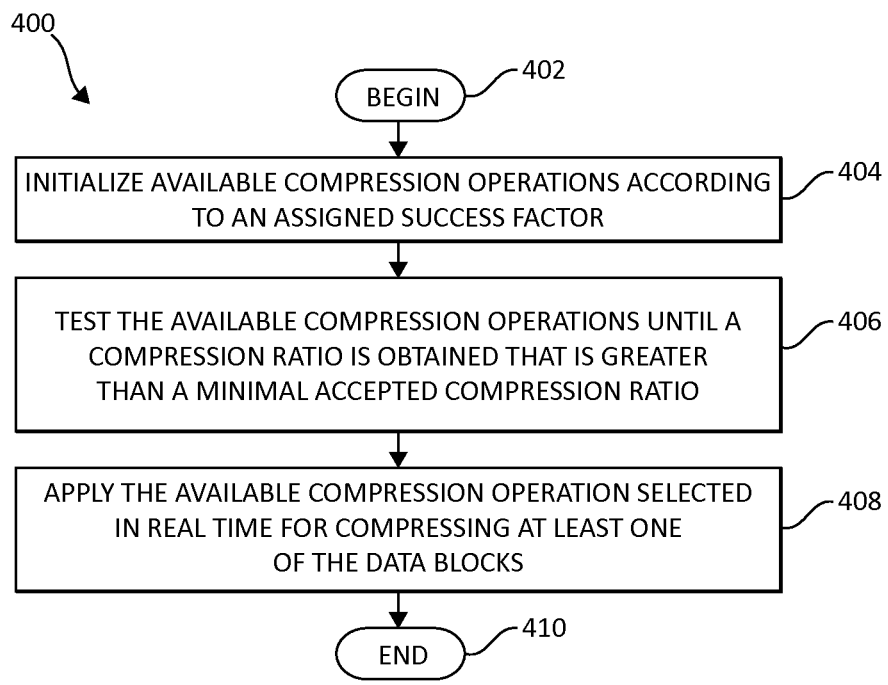
FIG. 4 is a flowchart illustrating an exemplary method for applying the compression ratio with a compression ratio greater than a minimal compression ratio.

FIG. 4 is a flowchart illustrating an exemplary method for applying the compression ratio with a compression ratio greater than a minimal compression ratio. The method 400 begins (step 402). Available compression operations are initialized according to an assigned (e.g., pre-defined) success factor (step 404). The success factor includes at least an accumulated sum value of the frequency of each of the available compression operations chosen as yielding a compression ratio greater than a minimal accepted and/or defined compression ratio. The success factor is used to reorder a list of the compression operations. The list order may reflect which compression operations are tested and/or tried and in which order. The method 400 may test the available compression operations until a compression ratio is obtained, which is higher than a minimal accepted compression ratio (step 406). The compression ratio that is found may or may not yield the highest compression ratio. Thus, not all of the available compression operations are required to be tested. The available compression operation selected in real time for compressing at least one of the data blocks is applied (step 408). The method 400 ends (step 410).

Figure 5:
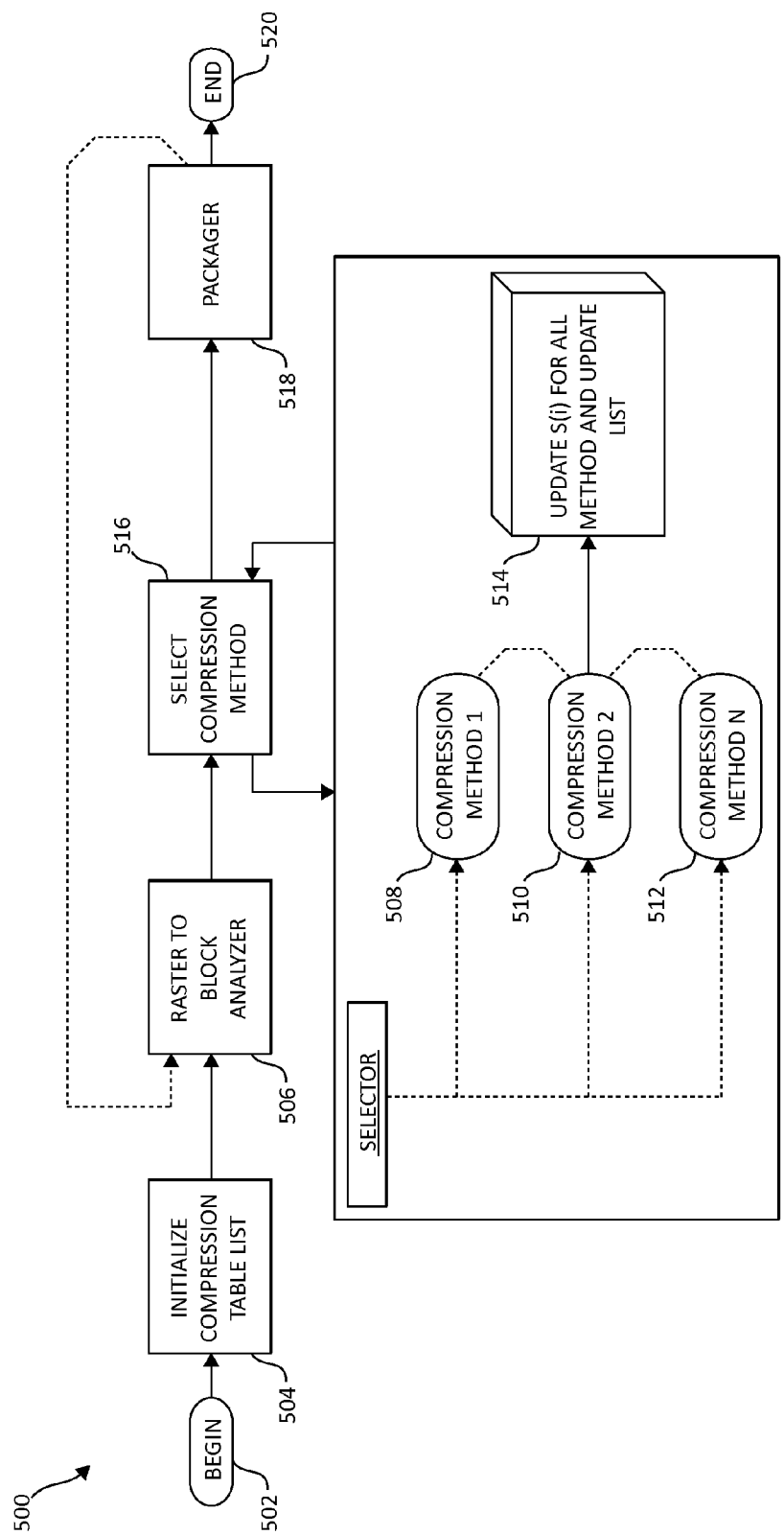
FIG. 5 is a flowchart illustrating an exemplary method for selecting the compression ratio with a compression ratio greater than a minimal compression ratio.

FIG. 5 is a flowchart illustrating an exemplary method 500 for selecting the compression ratio with a compression ratio greater than a minimal compression ratio. The method 500 begins (step 502). The method 500 will initialize a compression table list (step 504). The raster to block analyzer may read the input blocks and remove all the protocol layer info, if the protocol layer exists, and ensure the input include only payload data (step 506). For selecting the appropriate compression operation (labeled as compression method in the drawings) (step 516), the method 500 may test compression operation 1 (e.g., compression operation 1) (step 508), compression operation 2 (step 510) and compression operation n (step 512). The method 500 is testing to determine if at least one of the compression operations yields a compression ratio greater than a minimal compression ratio. The method 500 may update the rate and the list of compression operations (step 514). The compression operation (e.g., compression method) may be selected (step 516). The compression ratio that gains a compression ratio greater than the minimal compression ratio may be selected. The method 500 may configure a packager to consist with a container that includes a header with the first byte specifying the selected compression operation used, 4 bytes specifying the length of the compressed data and the compressed buffer (step 518). The method 500 may then return to (step 506) and continue with each successive step. The method ends (step 520).

In one embodiment, the mechanisms may select the best compression algorithm (e.g., the compression algorithm yielding the highest compression ratio above a minimal compression ratio) as follows. The mechanisms may define a minimal compression ratio to be accepted for determining which of those of the compression operations is to be selected. Ordering a list of the compression operations according to a rate (e.g., a rate being assigned to each of the compression operation representing an achieved compression ratio value), wherein the rate includes the compression ratio that is achieved by at least one of the compression operations. Each of the compression operations may be analyzed and tested for choosing the best compression ratio (e.g., selects a compression operation that yields a compression ratio that is greater than or higher than a minimal compression ratio that is defined). The mechanisms may continually apply at least one of the compression operations selected from the list for compressing subsequent data blocks until the compression ratio is less than a minimal compression ratio that is established. Once the currently applied compression operation falls below the defined minimal compression ratio, the mechanisms may try the next compression operation in the list until a new compression operation yielding a compression ratio greater than the minimal accepted and/or defined compression ratio is identified. The mechanisms may continue with a newly selected compression operation as long as it yields a compression ratio greater than the minimal defined compression ratio. Once the compression ratio of the newly selected compression operation, similar to the first selected compression operation, falls below and/or is less than the minimal defined compression ratio, the mechanisms will test/try the compression operations from a list until one of the compression operation yields a compression ratio greater than the minimal defined compression ratio. Over time, the efficiency of selecting and testing the correct compression algorithm increases allowing the mechanism to simply try less than 3 compression operations for every 10 blocks. Moreover, as part of the selection process, if the compression ratio of the compression operations in the list is less than the minimal compression ratio, the mechanisms may select the compression operation that is first in the list. The rate may be updated for each of the compression operations after being applied and the list may be updated. The list is ordered by success rate with the table reflecting data decentralism over time.

Figure 6:
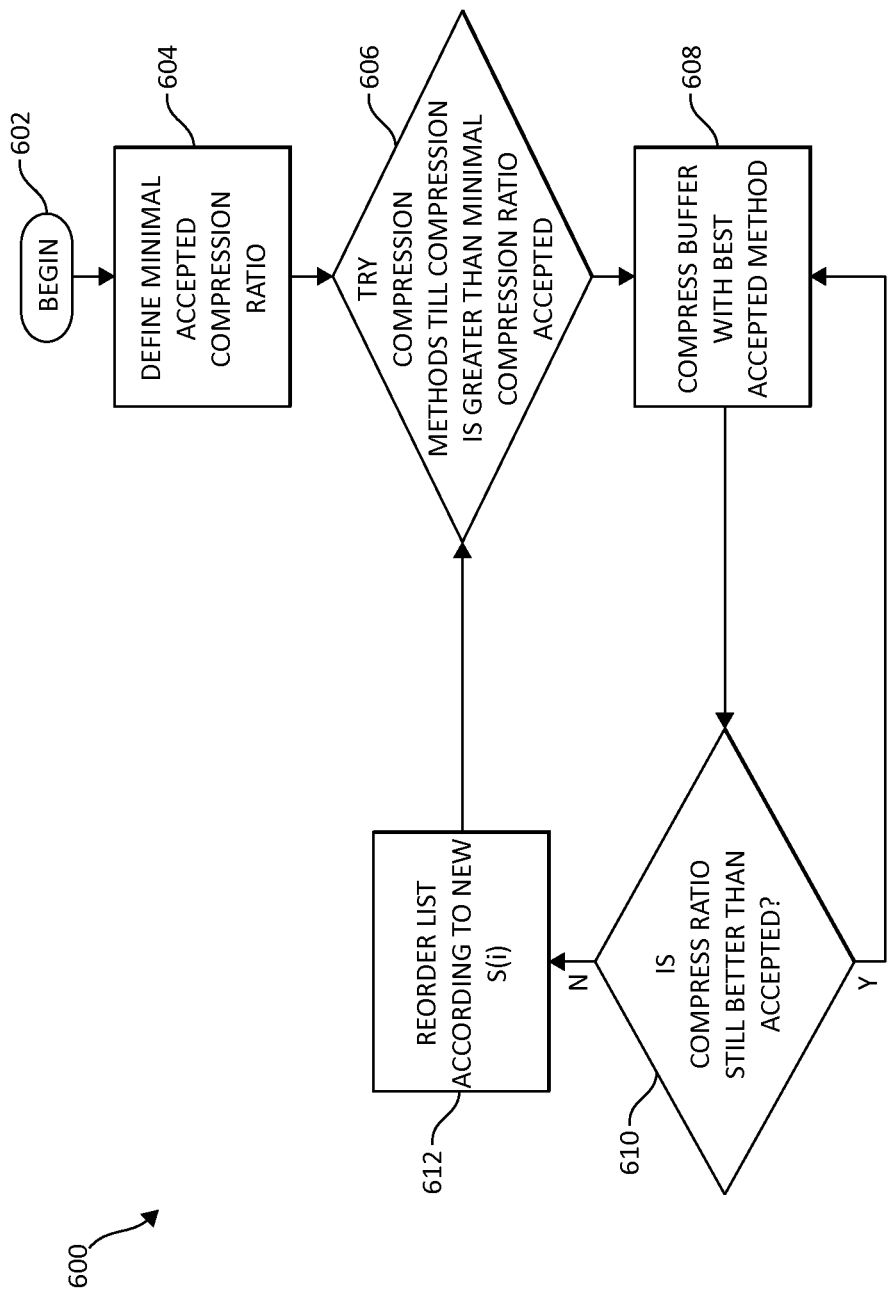
FIG. 6 is a flowchart illustrating an exemplary method for applying the compression operations using the compression operation list.

FIG. 6 is a flowchart illustrating an exemplary method 600 for applying the compression operations using the compression operation list. The method 600 begins (step 602) with defining a minimal accepted compression ratio (step 604). The method 600 may try compression operations until the compression ratio is greater than the minimal compression ratio that is accepted (step 606). A buffer is compressed by the compression operation with the highest (best) compression ratio (e.g., selects a compression operation that yields a compression ratio that is greater than or higher than a minimal compression ratio that is defined) that is accepted (step 608). The method 600 may also flush the current list order to a file. This allows the initialization of future restart/execution of environmental processes that are based upon previously learned state orders. After selecting the compression operation, the method 600 may determine if the compression ratio of the selected compression operation is still greater than the minimal compression ratio (step 610). If yes, the method 600 may continue using the compression ratio that is selected for compressing data blocks. If no, the method 600 may reorder the list according to a new rate that is assigned for each of the compression operations (step 612). The method 600 may continue testing and trying the compression operations until the compression ratio is greater than the minimal compression ratio that is accepted (step 606).

To illustrate the mechanisms of the present invention, the following example may be considered. For example, assume that the following input block streams are received; 10 text streams, 5 JPEG streams, and 5 PNG streams. Assume the compression operations are ordered in a list according to the following predefined manner: 1) ZLIB, 2) JPEG, 3) GIF, and 4) PNG. For purposes of this example, a minimal accepted compression ratio is defined to be at least 20 percent (20%). The mechanisms commence by testing/trying the first block with the ZLIB compression operation. The ZLIB compression operation yields an 80 percent (80%) compression ratio for each of the 10 text blocks. The Si is updated with D=1 for the ZLIB compression operation (the list in this case will stay the same, but may be reordered at a later time). The mechanisms will continue with the ZLIB compression operation until the compression ratio of the ZLIB compression operation falls below the minimal compression ratio, which is defined in this example as 20 percent (20%). Upon reaching the eleventh ($11^{th}$) block, which is the JPEG stream, the compression ratio obtained by the ZLIB compression operation is between 0 percent (0%) and 1 percent (1%). Since the compression ratio gained is less than the minimal compression ratio set as 20 percent (20%), the Si is update with D equals zero (e.g., D=0) and will continue to test/try the next available compression operation, which in this example would be the JPEG compression operation. The mechanisms then select the JPEG compression operation. Since it is JPEG specific, the compression ratio gained is 30 percent (30%), which is greater than the minimal compression ratio set as 20 percent (20%). Again, the mechanisms update the Si for the JPEG compression operation with D equals one (e.g., D=1) for the eleventh ($11^{th}$) block. The mechanisms continue with the JPEG compression operation until the sixteenth ($16^{th}$) block, which is a PNG block. The JPEG compression operation is applied to the PNG block, but the compression ratio is less than the minimal compression ratio set as 20 percent (20%). The JPEG compression operation's Si is updated with D equals zero (e.g., D=0). The mechanisms then select the ZLIB compression operation because it is still the highest-ranking compression operation within the list, even after previously using the JPEG compression operation. However, the compression ratio obtained by the ZLIB compression operation is less than the minimal compression ratio set as 20 percent (20%) so the mechanisms continue to apply each of the compression operations until reaching the PNG compression operation. The PNG compression operation gains a 25% compression ratio, which is greater than the minimal compression ratio set as 20 percent (20%) and thus the PNG compression operation is selected. (For this example, the GIF compression operation was tested and applied but the compression ratio was less than the minimal compression ratio.) The PNG compression operation's Si for the sixteenth ($16^{th}$) block Si is updated to D equals one (e.g., D=1). The PNG compression operation is then applied for each of the remaining PNG streams.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagram in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A system for real-time selection of compression operations in a computing environment, comprising:
    a processor device operable in the computing environment, wherein processor device is adapted for:
        initializing a plurality of available compression operations according to an assigned success factor,
        arranging the plurality of available compression operations in a list according to the assigned success factor, wherein a highest-ranking compression operation has a greater success rate in yielding a compression ratio that is greater than a minimal compression ratio than a lower-ranking compression operation,
        testing at least one of the plurality of available compression operations as to whether the at least one of the plurality of compression operations yields a compression ratio greater than a minimal compression ratio,
        if the tested at least one of the plurality of available compression operations yields a compression ratio greater than a minimal compression ratio, then applying the at least one of the plurality of available compression operations selected in real time for compressing at least one of a plurality of data blocks,
        if the tested at least one of the plurality of available compression operations yields a compression ratio less than a minimal compression ratio, then selecting the at least one of the plurality of available compression operations that is first in the list for the applying,
        pursuant to the applying, continually applying the at least one of the plurality of available compression operations for compressing a subsequent one of the at least one of the plurality of data blocks until the compression ratio is less than the minimal compression ratio; and
        updating the assigned success factor for each of the at least one of the plurality of available compression operations after the applying, and reordering the list based on the updated success factor,
    wherein:
        the assigned success factor includes at least an accumulated sum value of the frequency of each of the plurality of available compression operations chosen as yielding the compression ratio greater than the minimal compression ratio.

2. The system of claim 1, wherein the processor device is further adapted for defining the minimal compression ratio for determining which of those of the at least one of the plurality of available compression operations is to be selected.

3. A computer program product for real-time selection of compression operations in a computing environment by a processor device, the computer program product comprising a non-transitory computer-readable storage medium having computer-readable program code portions stored therein, the computer-readable program code portions comprising:
    a first executable portion for initializing a plurality of available compression operations according to an assigned success factor;
    a second executable portion for arranging the plurality of available compression operations in a list according to the assigned success factor, wherein a highest-ranking compression operation has a greater success rate in yielding a compression ratio that is greater than a minimal compression ratio than a lower-ranking compression operation;
    a third executable portion for testing at least one of the plurality of available compression operations as to whether the at least one of the plurality of compression operations yields a compression ratio greater than a minimal compression ratio;
    a fourth executable portion for, if the tested at least one of the plurality of available compression operations yields a compression ratio greater than a minimal compression ratio, then applying the at least one of the plurality of available compression operations selected in real time for compressing at least one of a plurality of data blocks;
    a fifth executable portion for, if the tested at least one of the plurality of available compression operations yields a compression ratio less than a minimal compression ratio, then selecting the at least one of the plurality of available compression operations that is first in the list for the applying;
    a sixth executable portion for, pursuant to the applying, continually applying the at least one of the plurality of available compression operations for compressing a subsequent one of the at least one of the plurality of data blocks until the compression ratio is less than the minimal compression ratio; and
    a seventh executable portion for updating the assigned success factor for each of the at least one of the plurality of available compression operations after the applying, and reordering the list based on the updated success factor,
    wherein:
        the assigned success factor includes at least an accumulated sum value of the frequency of each of the plurality of available compression operations chosen as yielding the compression ratio greater than the minimal compression ratio.

4. The computer program product of claim 3, further including a sixth executable portion for defining the minimal compression ratio for determining which of those of the at least one of the plurality of available compression operations is to be selected.

* * * * *